(12) United States Patent
Gopalakrishnan et al.

(10) Patent No.: US 6,536,271 B1
(45) Date of Patent: Mar. 25, 2003

(54) PUMP WITH INTEGRAL FLOW MONITORING

(75) Inventors: Sankaraiyer Gopalakrishnan, Huntington Beach, CA (US); Lloyd D. Hanson, Long Beach, CA (US)

(73) Assignee: Flowserve Management Company, Irving, TX (US)

( * ) Notice: Subject to any disclaimer, the term of this patent is extended or adjusted under 35 U.S.C. 154(b) by 0 days.

(21) Appl. No.: 09/951,894

(22) Filed: Sep. 13, 2001

(51) Int. Cl.$^7$ .............................................. G01M 19/00
(52) U.S. Cl. ...................................... 73/168; 73/861.42
(58) Field of Search ..................... 73/861.79, 861.86, 73/861.42, 861.59, 223, 152.57, 152.61, 168; 415/115, 118, 206, 208.1, 211.1, 212.1

(56) References Cited

U.S. PATENT DOCUMENTS 5,129,264 A 7/1992 Lorenc
6,126,392 A * 10/2000 Sabini .......................... 415/118
6,375,434 B1 * 4/2002 Taivalkoski et al. ........... 417/63

* cited by examiner

*Primary Examiner*—Hezron Williams
*Assistant Examiner*—Corey D. Mack
(74) *Attorney, Agent, or Firm*—Killworth, Gottman, Hagan & Schaeff, LLP (57) ABSTRACT

A centrifugal pump for transporting fluid with a housing, an impeller and a plurality of pressure sensors. Disposed within the housing is a volute section defined by a circumferential path through which a fluid may travel, a discharge section tangentially, aligned and in fluid communication with the volute section such that a flowpath is defined by fluid flowing from the volute section and through the discharge section; and a volute lip section defining a bifurcation point between the circumferential path and the discharge section. The plurality of pressure sensors are disposed within the volute section of the housing, and are spaced apart from one another such that pressure difference reading taken between each exhibit a substantially linear relationship with fluid flow rates to ensure accurate flow rate measurement.

17 Claims, 5 Drawing Sheets

PUMP WITH INTEGRAL FLOW MONITORING

BACKGROUND OF THE INVENTION

This invention relates to the integral flow measurement of centrifugal pumps, and more particularly to a flow measurement apparatus that utilizes differential pressure measurements at two separate locations within the volute section of the pump.

Centrifugal pumps are widely used in industry due to their compactness, simplicity, high efficiency, ease of maintenance and operation, and ability to deliver a stable flow of fluid. A typical centrifugal pump includes a housing with volute and discharge sections, both of which are in fluid communication with one another, and a rotating impeller. The volute section may comprise either single or multiple volutes. In general, the impeller imparts kinetic energy to the fluid, which moves circumferentially through the volute, past a volute lip and into the discharge. It is often desirable to monitor the flow of fluid through the pump to ensure that optimal process conditions are being met, and to do so in a way that is not susceptible to "downstream" flow obstructions that could induce erroneous readings. Since direct measurement of a fluid flow rate is a difficult undertaking, most flow measurements instead measure differences in static pressures at two different locations in a flow passage, then correlate that difference with a known flow constant, which is unique to the particular configuration of the flow measuring device. One of the advantages of using a flow constant to calculate flow rates is that the flow constant is not dependent on the aforementioned downstream conditions, although recommendations in terms of straight runs before and after the flow measurement device are usually made. Thus, an accurate measurement can be made irrespective of other constrictions, obstructions and the like found in the flowpath.

While flow measuring devices are routinely installed in more sophisticated, process-critical applications, their extra cost has traditionally not been warranted for many of the less expensive or more conventional pump applications. In recent years, however, the need to monitor even simple, inexpensive operations has marched in lock-step with end-user demands for consistent, repeatable, high-quality processes. Accordingly, the use of flow measurement sensors and ancillary support equipment for even conventional applications employing centrifugal pumps is in its ascendancy. However, the attachment of sensors and instrumentation to the pump can present significant cost and reliability burdens, in the form of installation and maintenance issues, especially when the sensor is exposed to harsh or heavily-travelled environments that increase the likelihood that they will be damaged or otherwise rendered inoperative.

SUMMARY OF THE INVENTION

It is therefore an object of the present invention to provide a centrifugal pump adapted for measuring fluid flow that overcomes the disadvantages of the prior art. According to a first aspect of the invention, a centrifugal pump includes a housing with an internal flowpath wall that defines volute and discharge sections, each section separated by a volute lip, an impeller, and pressure sensors integrally disposed in the housing wall. The impeller is disposed within the volute section, which in turn is defined by a circumferential path through which a fluid travels in response to impeller rotation. The discharge section is tangentially aligned and in fluid communication with the volute section such that fluid flowing through the volute section then passes through the discharge section. The volute lip section defines a bifurcation point between the volute and discharge sections. The sensors are embedded into the volute section of the housing wall such that they are exposed to a portion of the flowpath, thus placing them in fluid communication with liquid flowing therethrough such that they are responsive to changes in fluid pressure caused by variations in fluid flow.

The sensors may be circumferentially spaced apart in the volute section with one substantially adjacent the volute lip, with the other downstream such that the angle subtended between them is approximately 270°. The present inventors have discovered that the placement of the former sensor is such that, because the region it occupies captures very little flow (thus ensuring low dependence on flow rate), its use in conjunction with the latter sensor, placed in a downstream location in the volute section that, while dependent on flow, is relatively immune to further downstream conditions (such as those found closer to the exit plane of the discharge), thus resulting in a more accurate flow measuring system. A comparator device may be used to analyze the pressure measurements taken from each of the sensors, and a flow measurement output from the comparator is substantially linearly related to the difference in the pressure measurements taken from each of the sensors. As used in conjunction with the present disclosure, the term "substantially" refers to an arrangement of elements or features that, while in theory would be expected to exhibit exact correspondence or behavior, may, in practice embody something slightly less than exact.

According to another aspect of the invention, a method of measuring fluid flow through a centrifugal pump is disclosed. The method includes the steps of configuring the pump to include a housing with an impeller disposed therein, a flowpath defined by a volute section, discharge section and volute lip section in fluid communication with one another, and a plurality of sensors circumferentially mounted to and spaced apart in the volute section; placing the pump in fluid communication with a fluid; operating the pump such that the fluid flows through at least a portion of the flowpath; taking measurements of the fluid at each location of the plurality of sensors; comparing the measurements taken at each of the locations with one another, thereby establishing a differential; inputting the differential into an algorithm configured to compare the differential to a flow constant; calculating a flow rate with the algorithm; and outputting the flow rate.

Optionally, the sensors used to take the measurements are pressure sensors, and the differentials established are pressure differentials. In addition, the flow rate can be output in human-intelligible or machine-readable format. A further step may involve transmitting the sensed signals from each of the plurality of sensors by a wireless transmitter to a signal comparator prior to comparing the measurements with one another. Also, a flow measurement output from the comparator is based on a linear relationship between the measurements of each of the plurality of sensors.

Other features and advantages of the invention will be apparent from the following description, the accompanying drawings and the appended claims.

DETAILED DESCRIPTION OF THE INVENTION

Figure 1:
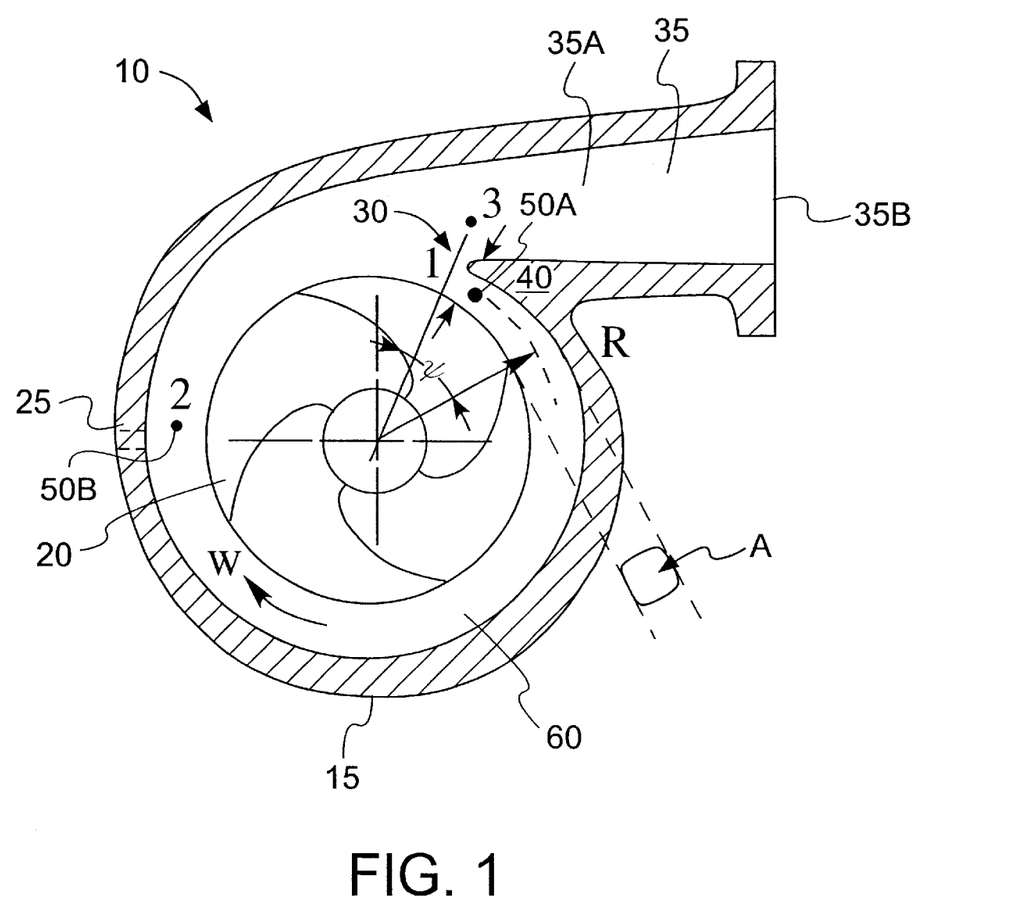
FIG. 1 is a sectional view of an embodiment of the centrifugal pump of the present invention.

Referring now to FIG. 1, a centrifugal pump 10 includes a pump housing 15, impeller 20, volute section 25, volute lip. 30, and discharge section 35 comprising discharge inlet 35A and discharge outlet 35B. The volute section 25 occupies that portion of the flowpath 60 substantially between location 1 and location 3, while the discharge section 35 commences substantially at location 3 where, due to the bifurcation at volute lip 30, reentry of fluid under ordinary pump operating conditions into the volute section at location 1 is not possible. The term "ordinary" operating conditions are those regimes reasonably close to the pump's design operating condition, and does not include very low overall flow, where due to unsteady velocity changes flow reversal, also known as discharge recirculation, is possible. Discharge inlet 35A accepts fluid (such as water) pumped circumferentially through the volute section 25 from impeller 20, while discharge outlet 35B is connected to the next downstream piece of fluid handling equipment (not shown). Pressure sensors 50A and 50B are mounted in the walls of volute section 25, with their pressure-sensing mechanism exposed to the flowpath 60 cavity (defined by profile A) of the volute section 25 such that the flow of fluid past the sensors 50A, 5B causes a pressure reading in each. In the present context, the term "pressure sensor" can be used interchangeably with a "pressure tap" or similar terminology to indicate a measuring device placed adjacent or through a wall in the pump flowpath 60 such that the sensor is capable of sensing pressure variations within the flowpath 60. Sensor 50A is preferably placed adjacent volute lip 30, while sensor 50B is preferably placed approximately 270° downstream (i.e: rotating clockwise) of sensor 50A.

The volute cross-sectional areas are normally designed such that at the best efficiency point (BEP) of the pump 10, the velocities and pressures of the fluid are uniform in the circumferential direction. For this condition to hold, it can be shown that:

$$\left(\frac{A}{R}\right)_\psi = \frac{Q\omega\eta}{gH}\frac{\psi}{2\pi}$$

where:

ψ is the angular coordinate;

A is the cross-sectional area at the angular location ψ;

R is the mean volute radius at angular location ψ;

Q is the flow rate;

ω is the impeller angular velocity;

η is the pump hydraulic efficiency;

g is the acceleration due to gravity; and

H is the pump head, or pressure.

For a volute designed according to this criterion, it is evident that at BEP, the pressure at location 1 will be equal to that of location 2. Accordingly, the pressure difference between these points equals zero. At off-design conditions, the pressure at location 1 remains substantially the same (unless the volute lip to impeller clearance, marked between the arrows 40, is very large) as the tight clearance at that location captures very little flow. However, the pressure at location 2 will vary substantially with flow, with higher pressure at low flows, and lower pressure at higher flows. Therefore, the measured pressure difference between locations 2 and 1 will be positive at flow rates less than BEP and negative for flow rates greater than BEP. In fact, this behavior is true for conventional centrifugal pumps having backward leaning impeller vanes.

It can be shown further that the intrinsic property of volute type centrifugal pumps leads to linear variations of this pressure difference with flow. To demonstrate this, we start with the theoretical pressure rise caused by impeller 20, given by $$H_{th} = \frac{U^2}{g}(1-kQ)$$

where U is the tip speed of the impeller, k is a constant related to impeller exit area and vane angle, and $H_{th}$ is the theoretical head rise generated by the impeller. Since pressure at location 1 is proportional to $H_{th}$ at BEP, $$P_1(1-kQ_{BEP})$$

and pressure at location 2 is proportional to $H_{th}$ at the given flow, $$P_2(1-kQ)$$

this leads to the following:

$$P_2-P_1 (Q_{BEP}-Q)$$

Figure 2:
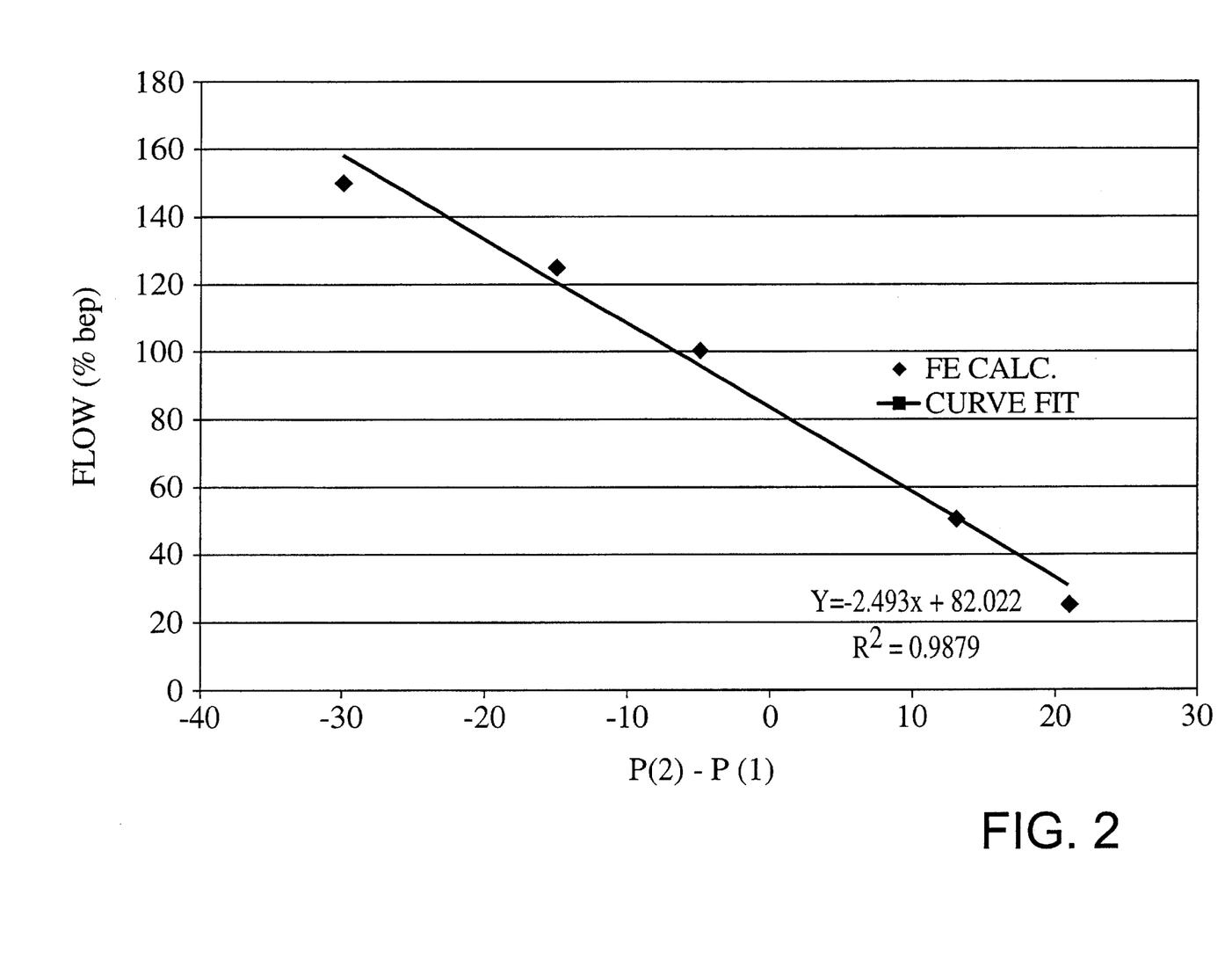
FIG. 2 is a sample calibration curve for the pump of FIG. 1.

While the above analysis indicates the linear dependency, finite element procedures are necessary to determine the actual relationship for any give pump geometry. This has been performed and reported in "Interaction between Impeller and Volute of Pumps at Off-Design Conditions" by J. A. Lorett and S. Gopalakrishnan, Transactions of the ASME, March 1986, pp. 12–18, herein incorporated by reference. The result of using this method on one example, deduced from FIG. 8 of above mentioned reference, is shown as FIG. 2. In this figure, a linear curve is fitted on the calculated data, with excellent agreement demonstrated over a wide range of flow conditions. The linear curve fit equation for this case is $$Q/Q_{BEP}=2.493(P_2-P_1)+82$$

where $Q/Q_{BEP}$ is in percent, and $P_2-P_1$ is expressed in meters.

Figure 3:
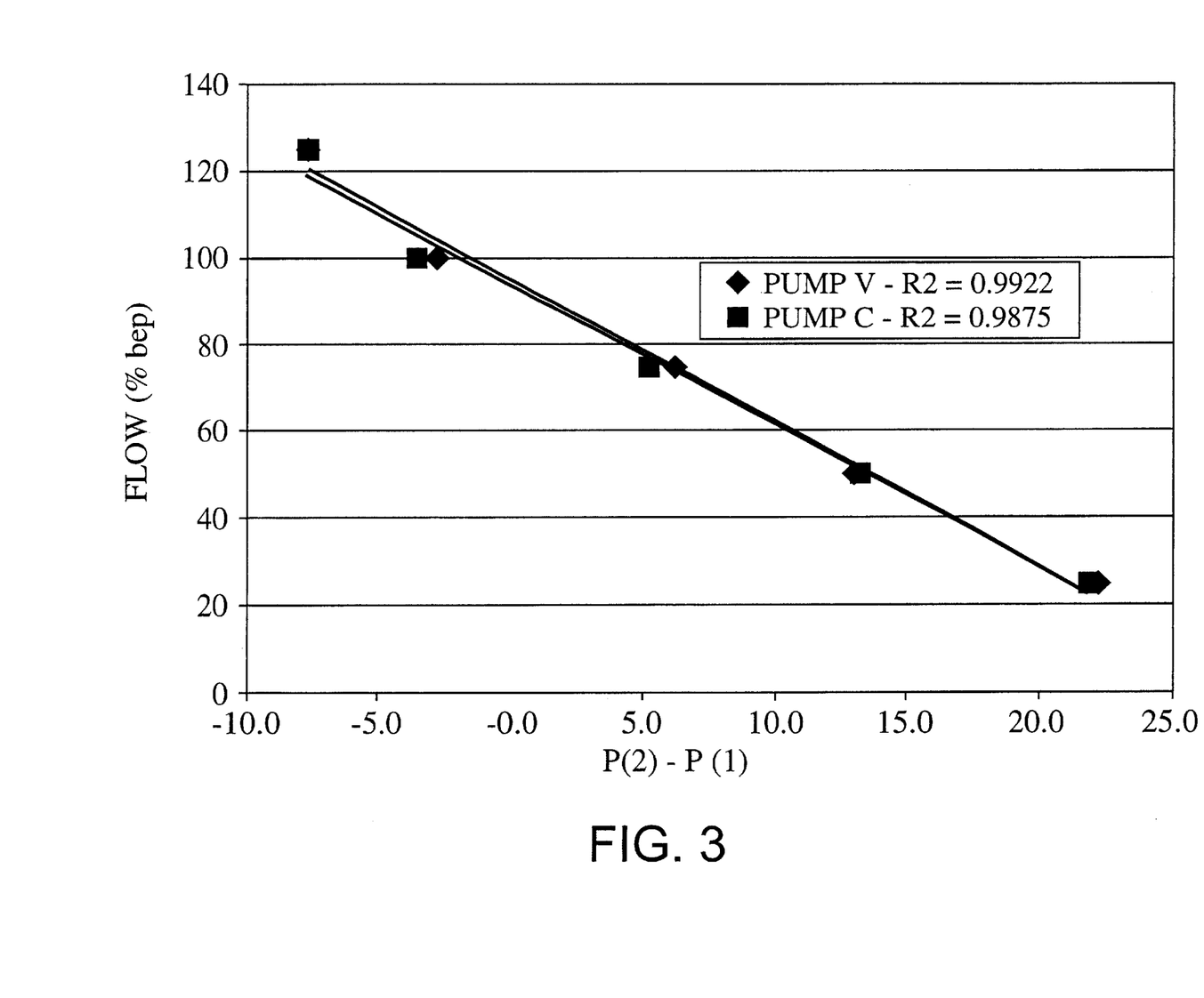
FIG. 3 shows another calibration curve for two different pumps.

Since the above demonstrates that a linear curve fit represents theory correctly, we can eliminate the need for finite element analysis for each pump application. Instead, calibration curves can be established at the factory for different pumps. An example of this is shown in FIG. 3 for two different pumps, where actual test data points are fitted linearly. The linear regression analysis shows the curve fit quality to be very good, as the average of the square of the error is about 1%.

The incorporation of this one-for-one relationship, where the resulting dependence between flow and pressure is substantially linear, leads to more accurate flow measurements, as a linear correlation inherently permits the introduction of less error between the measured pressure differences at the essentially constant reference location 1 and the varying location 2 than a comparable nonlinear relationship. This linearized flow measurement is especially valuable at low flow and other off-design conditions, where the improved sensitivity abrogates the need for separate outlet flow restriction devices that are otherwise needed to establish steady, known outlet conditions. This can be seen in FIG. 1, where discharge outlet 35B permits the flow of fluid to downstream portions (not shown) without recourse to a reduction member, orifice plate or related flow constriction device. The linear variation of the flow conditions made possible by the proper relative positioning of the sensors 50A and 50B in conjunction with the appropriate absolute positioning of sensor 50A provides an additional sensitivity advantage in that precise placement of the sensors 50A, 50B is not critical, thus avoiding the dependence of the measurements on local curvatures within the volute 25 or discharge 35 section walls, or downstream flow obstructions, especially those where the geometry changes with flow, as in an asymmetric valve or related flow control device (not shown).

Figure 4:
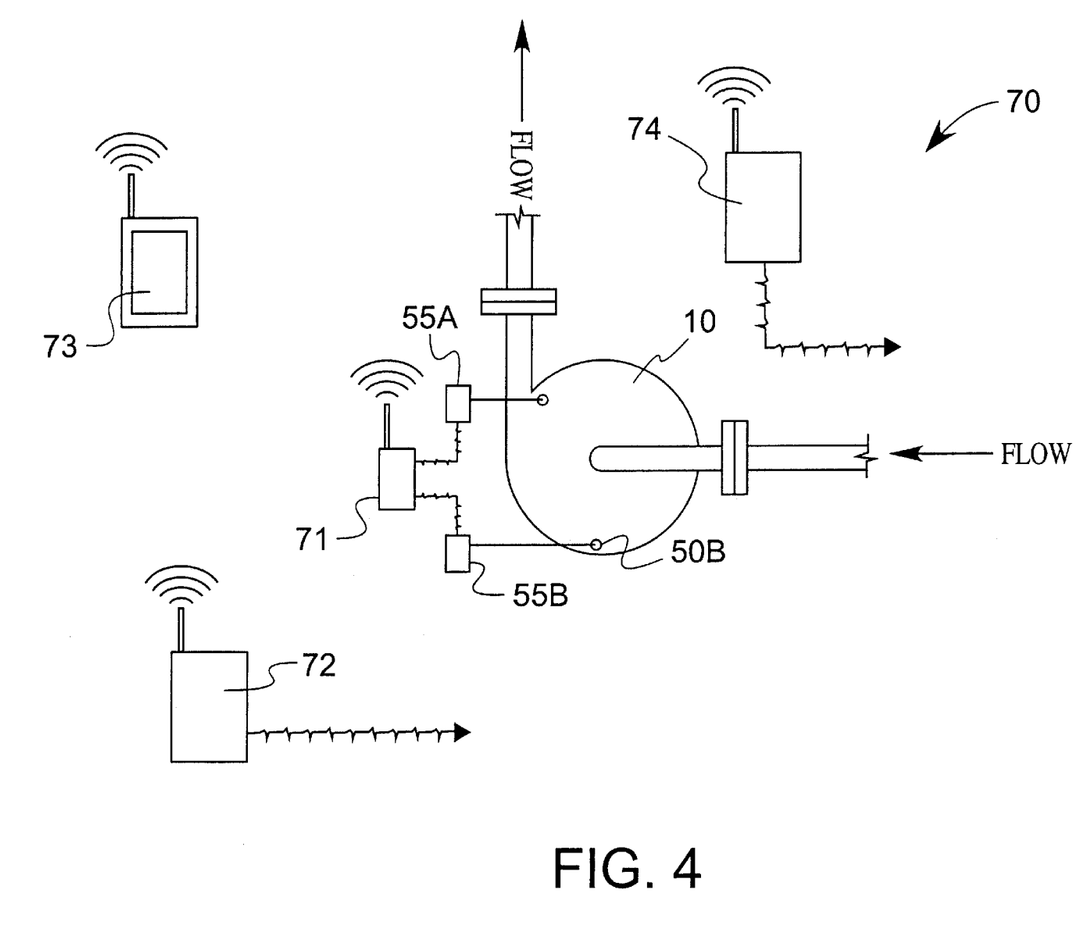
FIG. 4 shows the integration of the WINS and the flow measuring device.

Sensors 50A, 50B can exploit wireless integrated monitoring system (WINS) technology to provide full-function signal sensing and transmittal. The WINS augmented flow monitoring, as in FIG. 4, extends the measurement function of the differential pressure data gathered from sensors 50A and 50B. Note that sensor output 55A, 55B could also be combined in a single instrument (not shown). In either configuration, the sensor output 55A, 55B can be correlated in a comparator (not shown) to produce a differential pressure measurement. From there, a WINS node 71 calculates flow based on the predetermined algorithm and calibration, both previously discussed. The WINS node 71 broadcasts this information to various receivers where the flow can then be monitored, through a WINS base 72 or portable device 73, or used for control purposes, such as with WINS controller 74. Output to the WINS base 72 from WINS node 71 can then be routed to data storage devices or external sites, such as a local area network (LAN), remote internet location, or to a user viewing device in human-readable format. Similarly, the output from WINS node 71 can be sent to a portable data logger or viewer 73, where such output can be especially useful in "field" operations, where small, hand-held devices can be easily transported. To provide automated control of operation for pump 10, the WINS node 71 output can also send the sensed output to WINS controller 74. From there, a control signal can be sent to either a valve or a speed control for pump 10. By virtue of their extensive use of telemetry, the risk of equipment breakage and malfunction is reduced, as extraneous wiring and attendant harnessing are no longer occupying space in high traffic areas or in harsh environments. As indicated by its name, WINS technology also facilitates the integration of additional pump 10 monitoring functions, including vibration and temperature (not shown). This level of integration further reduces the complexity associated with separate componentry.

Figure 5A:
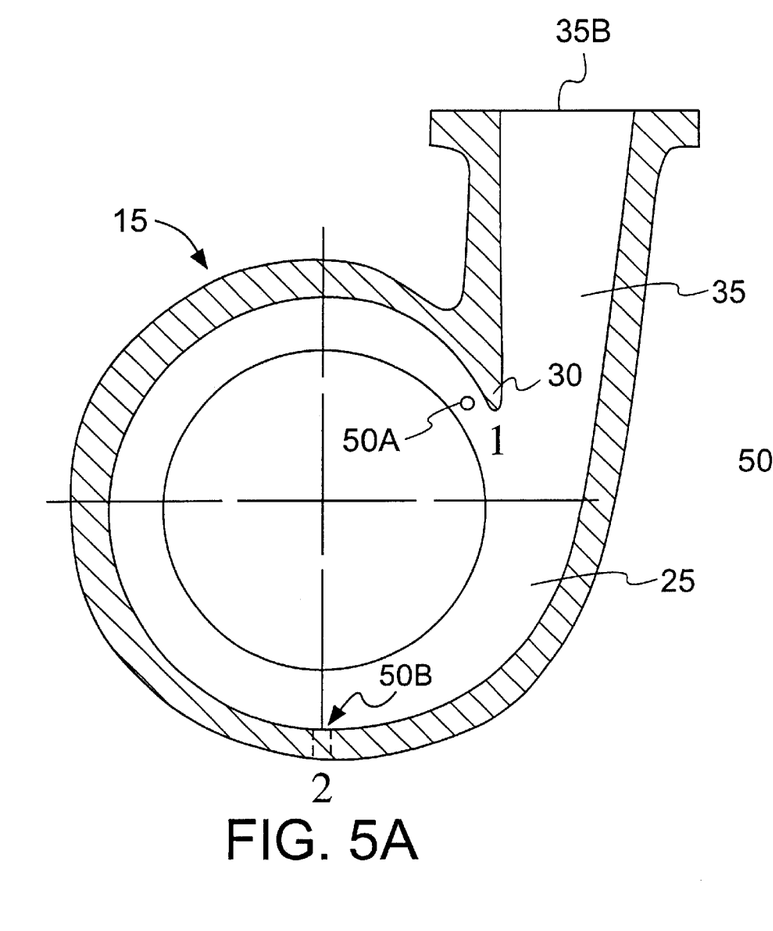
FIGS. 5A and 5B show a sectional and end view, respectively, of the centrifugal pump of FIG. 1 with alternate notional locations of the pressure sensors.
Figure 5B:
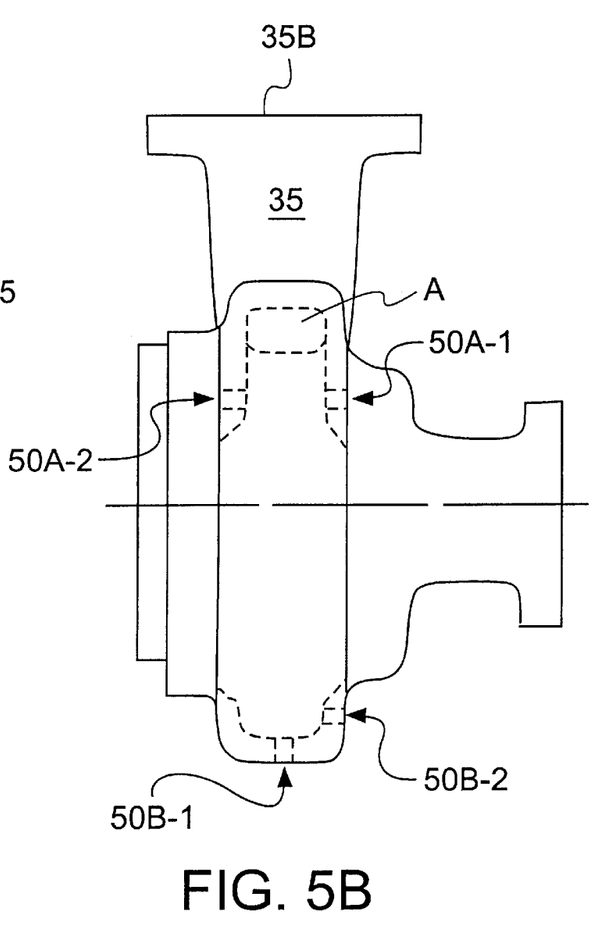

Referring now to FIGS. 5A and 5B, variable mounting locations of the pressure sensors 50A and 50B are shown, with notional orthogonal mounting positions 50A-1 and 50A-2 for the sensor at location 1, and notional mounting positions 50B-1 and 50B-2 for the sensor at location 2. It is important to note that the accuracy in flow measuring made possible by the present system permits additional design flexibility with regard to sensor placement; for example, it is not necessary that sensor 50A be placed in a different clockwise position within the housing wall (when viewed in cross-section) from sensor 50B to ensure optimum accuracy.

Having described the present invention in detail and by reference to the embodiments thereof, it will be apparent that modifications and variations are possible without departing from the scope of the invention in the following claims.

What is claimed is:

1. A centrifugal pump for transporting fluid, said pump comprising:
    a housing including:
        a volute section disposed therein, said volute section defined by a circumferential path through which a fluid may travel;
        a discharge section tangentially aligned and in fluid communication with said volute section such that a flowpath is defined by fluid flowing through said volute section and through said discharge section; and
        a volute lip section defining a bifurcation point between said volute section and said discharge section;
        an impeller disposed within said volute section of said housing; and
        a plurality of pressure sensors disposed within said volute section of said housing such that said sensors are exposed to a portion of said flowpath corresponding to said volute section.

2. The centrifugal pump of claim 1, wherein a first and second of said plurality of pressure sensors are circumferentially spaced apart in said volute section.

3. The centrifugal pump of claim 2, wherein said first of said plurality of pressure sensors is upstream of said second of said plurality of pressure sensors by at least about 180°.

4. The centrifugal pump of claim 2, wherein said first of said plurality of pressure sensors is upstream of said second of said plurality of pressure sensors by about 180° to about 360°.

5. The centrifugal pump of claim 2, wherein an angle subtended between said first and second of said plurality of pressure sensors is approximately 270°.

6. The centrifugal pump of claim 2, wherein said second of said plurality of pressure sensors is upstream of said bifurcation point by at least about 30°.

7. The centrifugal pump of claim 2, wherein said second of said plurality of pressure sensors is upstream of said bifurcation point by about 30° to about 180°.

8. The centrifugal pump of claim 2, wherein said second of said plurality of pressure sensors is upstream of said bifurcation point by about 90°.

9. The centrifugal pump of claim 2, further comprising a comparator device configured to analyze the pressure measurements of each of said plurality of sensors.

10. The centrifugal pump of claim 9, wherein said comparator is further configured such that a flow measurement output from said comparator is based on a substantially linear relationship between said pressure measurements of each of said plurality of sensors.

11. The centrifugal pump of claim 1, wherein said impeller is coupled to a drive mechanism such that said impeller is rotationally responsive to said drive mechanism.

12. A method of measuring fluid flow through a centrifugal pump, said method comprising the steps of:
    configuring said pump to include:
        a housing with an impeller disposed therein;
        a flowpath defined by a volute section, discharge section and volute lip section in fluid communication with one another; and
        a plurality of sensors circumferentially mounted to and spaced apart in said volute section;
    placing said pump in fluid communication with a fluid;
    operating said pump such that said fluid flows through at least a portion of said flowpath;

taking measurements of said fluid at each location of said plurality of sensors;

comparing said measurements taken at each of said locations with one another, thereby establishing a differential;

inputting said differential into an algorithm configured to compare said differential to a flow constant;

calculating a flow rate with said algorithm; and outputting said flow rate.

13. A method according to claim 12, wherein said sensors are pressure-measuring sensors, said measurements are pressure measurements, and said differential is a pressure differential.

14. A method according to claim 12, wherein said flow rate is output in human-intelligible format.

15. A method according to claim 12, wherein said flow rate is output in machine-readable format.

16. A method according to claim 12, further comprising the step of transmitting the sensed signals from each of said plurality of sensors by a wireless transmitter to a signal comparator prior to comparing said measurements with one another.

17. The method according to claim 16, wherein a flow measurement output from said comparator is based on a linear relationship between said measurements of each of said plurality of sensors.

* * * * *

UNITED STATES PATENT AND TRADEMARK OFFICE
CERTIFICATE OF CORRECTION

PATENT NO.     : 6,536,271 B1
DATED          : March 25, 2003
INVENTOR(S)    : Gopalakrishnan et al.

It is certified that error appears in the above-identified patent and that said Letters Patent is hereby corrected as shown below:

<u>Title page,</u>
Item [57], ABSTRACT,
Line 5, "tangentially, aligned" should be -- tangentially aligned --
Line 12, "difference reading taken" should be -- difference readings taken --;

<u>Column 4,</u>
Line 25, "$P_1 (1 - kQ_{BEP})$" should be -- $P_1 \propto (1 - kQ_{BEP})$ --;
Line 30, "$P_2 (1 - kQ)$" should be -- $P_2 \propto (1 - kQ)$ --;
Line 34, "$P_2 - P_1 (Q_{BEP} - Q)$" should be -- $P_2 - P_1 \propto (Q_{BEP} - Q)$ --; and
Line 48, "$Q/Q_{BEP} = 2.493(P_2 - P_1) + 82$" should be
-- $Q/Q_{BEP} = -2.493(P_2 - P_1) + 82$ --.

Signed and Sealed this

Ninth Day of September, 2003

JAMES E. ROGAN
*Director of the United States Patent and Trademark Office*